(12) United States Patent
Velsko et al.

(10) Patent No.: US 6,421,166 B1
(45) Date of Patent: Jul. 16, 2002

(54) COMPACT, FLEXIBLE, FREQUENCY AGILE PARAMETRIC WAVELENGTH CONVERTER

(75) Inventors: Stephan P. Velsko, Livermore; Steven T. Yang, Danville, both of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/567,388

(22) Filed: May 9, 2000

(51) Int. Cl.[7] .................................................. G02F 1/39
(52) U.S. Cl. ...................................... 359/330; 359/326
(58) Field of Search ................................. 359/326–332

(56) References Cited

U.S. PATENT DOCUMENTS 5,841,570 A * 11/1998 Velsko ........................ 359/330

OTHER PUBLICATIONS

Grayson et al, "Frequency–Agile Laser Radar Using A Periodically–Poled Lithium Niobate Optical Parametric Oscillator", Proceeding of the IEEE 1996 National Aerospace and Electronics Conference (NAECON 1996), vol. 2, pp. 678–685, May 20–23, 1996.*

Noblett et al, "Electro–Optic Tuning Of Optical Parametric Oscillators", 1996 IEEE Lasers And Electro–Optics Society Annual Meeting (LEOS 96), vol. 1, pp. 18–19, 1996.*

* cited by examiner

Primary Examiner—John D. Lee
(74) Attorney, Agent, or Firm—John P. Woolridge; Alan H. Thompson

(57) ABSTRACT

This improved Frequency Agile Optical Parametric Oscillator provides near on-axis pumping of a single QPMC with a tilted periodically poled grating to overcome the necessity to find a particular crystal that will permit collinear birefringence in order to obtain a desired tuning range. A tilted grating design and the elongation of the transverse profile of the pump beam in the angle tuning plane of the FA-OPO reduces the rate of change of the overlap between the pumped volume in the crystal and the resonated and non-resonated wave mode volumes as the pump beam angle is changed. A folded mirror set relays the pivot point for beam steering from a beam deflector to the center of the FA-OPO crystal. This reduces the footprint of the device by as much as a factor of two over that obtained when using the refractive telescope design.

20 Claims, 5 Drawing Sheets

COMPACT, FLEXIBLE, FREQUENCY AGILE PARAMETRIC WAVELENGTH CONVERTER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the generation of tunable coherent radiation, and more specifically, it relates to a frequency agile parametric wavelength converter that can be used for applications in, e.g., spectroscopy, remote sensing, and laser radar.

2. Description of Related Art

U.S. Pat. No. 5,841,570 titled " Frequency Agile Optical Parametric Oscillator," discloses a design for a frequency agile optical parametric oscillator (FA-OPO) that permits pulse-to-pulse changes in the output frequency at repetition rates limited only by the pulsed laser repetition rate and the angle deflection rate of commercial beam deflector technology. The design disclosed in the referenced patent has the following three limitations:

A first limitation of the previous design arises because it is based on the principle of birefringence phasematching, which permits the existence of a nearly linear relationship between the angle of the pump beam, about the collinear phase matching condition in the nonlinear crystal, and the wavelength generated. Thus, a useful range of output wavelengths can be generated with small changes in pump beam angle, making the device practical. However, obtaining a desired tuning range depends on finding a particular crystal that will permit collinear birefringence phasematching at the center wavelength of the desired tuning range. This feature restricts the applicability of the frequency agile optical parametric oscillator design to particular wavelength regions determined by available crystals. Moreover, because the effective nonlinear coefficient and walk-off angle in the available crystal cannot be controlled, restrictions on the required minimum input pump pulse energy for efficient OPO wavelength conversion may apply.

A second limitation in the previous design occurs because, as the pump beam angle is changed, there is a corresponding rapid change in the overlap between the pumped volume in the nonlinear crystal and the mode volume of the resonated wave, leading to distortions of the output beam shape and a reduction of the output energy.

A third limitation in the previous design is that the relay telescope component does not permit a compact folded path to reduce the physical "foot print" of the device.

It is known that quasiphasematched crystals such as periodically poled lithium niobate (PPLN) can be fabricated to achieve collinear phasematching to produce any desired wavelength from an OPO by changing the quasiphasematching period. In addition, quasiphasematched crystals are generally fabricated in a way that achieves very large nonlinear coupling coefficients, which leads to larger frequency conversion efficiencies. However, quasiphasematched crystals have very small angle tuning ranges around their collinear phasematching orientations, and to-date, large changes in output wavelength could only be achieved by using very large pump angles. At large angles, the overlap of the interacting light waves is reduced, lowering the efficiency of the device. The OPO design of the present invention allows the practical use of quasiphasematched crystals in a frequency agile OPO by greatly increasing the tuning rate and reducing the change in overlap over the same tuning range.

SUMMARY OF THE INVENTION

It is an object of the present invention to provide an improved frequency agile optical parametric oscillator that includes a quasiphasematched crystal (QPMC) with a tilted grating, an off-axis reflective relay telescope, and an anamorphic beam expander.

This device improves upon a previously disclosed design U.S. Pat. No. 5,841,570 titled "Frequency Agile Optical Parametric Oscillator," incorporated herein by reference, by (1) permitting a more flexible class of nonlinear crystals to be used, (2) providing more efficient operation over a wider tuning range, and (3) permitting a more compact device to be fabricated.

In the prior art, obtaining a desired tuning range has depended on finding a particular crystal that will permit collinear birefringence phasematching at the center wavelength of the desired tuning range. In the FA-OPO of the present invention, this limitation is overcome by near on-axis pumping of a single QPMC with a tilted periodically poled grating.

The second limitation of the prior art design is overcome in the present invention by both the tilted grating design and by the elongation of the transverse profile of the pump beam in the angle-tuning plane of the FA-OPO. This reduces the rate of change of the overlap between the pumped volume in the crystal and the resonated and non-resonated wave mode volumes as the pump beam angle is changed. Tilting the domain period has the effect of shifting both the tuning curve symmetry point and the location of the peak effective crystal length. Since these two points shift at different rates, by tilting the grating a sufficient amount, the peak effective crystal length can be positioned to overlap with the desired tuning range.

In the prior art, the third limitation in the previous design is that the relay telescope component does not permit a compact folded path. This limitation is overcome in the present invention by using a folded mirror set to relay the pivot point for beam steering from the beam deflector to the center of the FA-OPO crystal. This reduces the footprint of the device by as much as a factor of two over that obtained when using the refractive telescope design cited in the previous invention.

On embodiment of the invention utilizes periodically poled lithium niobate (PPLN) as the QPMC crystal 24 material, and further includes OPO mirrors 20 and 22 that reflect light in the 2700–3300 $cm^{-1}$ region. This embodiment is pumped by an Nd:YAG laser with a wavelength of 1.06 $\mu$m. FIG. 3 shows tuning curves for tilted and non-tilted grating PPLN OPO's resonating light in the 2700–3300 $cm^{-1}$ region. The figure shows that the tuning range ($cm^{-1}$ per milliradian of pump angle) of the tilted grating device is improved over that of the standard non-tilted grating. This improvement permits substantially larger tuning ranges, thus making it practical to use a QPMC in an FA-OPO device. The performance of the FA-OPO is improved by the large nonlinear coupling coefficient of QPMCs and the flexibility of wavelength tuning range afforded by the variation in poling period. The availability of such a wide tuning range has implications for several lidar applications, including aerosol sizing and chemical detection.

The QPMC may comprise periodically poled lithium niobate, lithium tantalate, potassium titanyl phosphate (KTP), potassium titanyl arsenate (KTA) or rubidium titanyl arsenate (RTA). Quasiphasematched stacks of GaAs or related semiconductor structures may also be substituted for the QPMC.

DETAILED DESCRIPTION OF THE INVENTION

In the invention of U.S. Pat. No. 5,841,570, obtaining a desired tuning range depends on finding a particular crystal that will permit collinear birefringence phasematching at the center wavelength of the desired tuning range. In the FA-OPO of the present invention, this limitation is overcome by near on-axis pumping of a single QPMC with a tilted periodically poled grating. Unlike birefringence phasematched crystals, the vector phasematching condition for a QPMC contains two unique degrees of freedom that can be selected to produce a material with desired noncollinear tuning properties as required by the rapidly tunable OPO. In the prior art, it is known that the grating period $1_c$ can be changed to produce noncritical phasematching at a desired frequency. In the present invention, the angle of the grating $\phi_g$ is modified with respect to the resonator axis.

Figure 1:
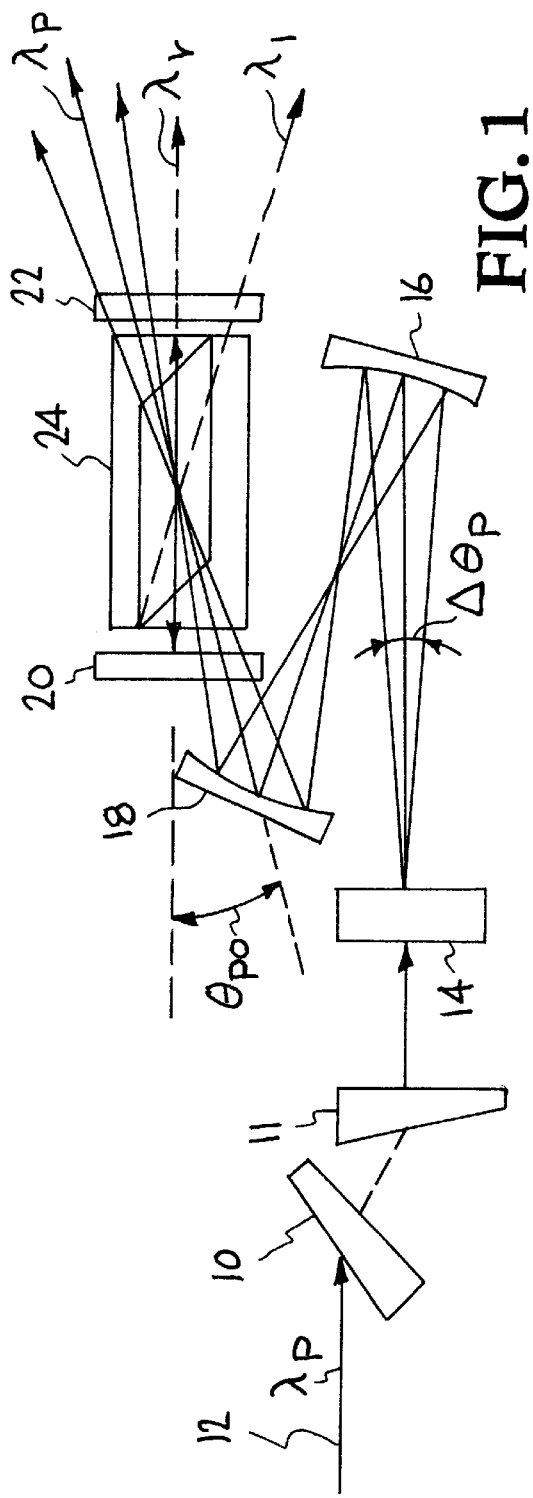
FIG. 1 shows an embodiment of the rapidly tunable OPO of the present invention.

A schematic diagram of an embodiment of the improved frequency agile optical parametric oscillator of the present invention is shown in FIG. 1. The anamorphic beam expander prism pair comprising prisms 10 and 11 expands the pump laser beam 12 in the plane parallel to the plane of beam deflection produced by the acousto-optic beam deflector 14. A pair of curved mirrors 16 and 18 form an image relay set to place the pivot point of the deflection into the center of the optical parametric oscillator formed by mirrors 20 and 22 and the quasiphasematched crystal QPMC 24. The resonated wavelength $\lambda_r$ and the idler wavelength $\lambda_i$ are generated in the optical parametric oscillator and change as the angle of the pump beam 12 changes. The centerline of the pump beam is placed at an angle $\theta_{po}$ with respect to the axis of the OPO cavity defined by mirror 20 and mirror 22. The angle $\theta_{po}$ is chosen to give the desired rate of angle tuning (i.e., rate of change of $\lambda_r$ and $\lambda_i$ with change of pump angle) for a given QPMC by use of the phasematching condition.

Rapid tuning is accomplished by deflecting the angle of the pump beam in synchronicity with the arrival of the pump pulses. The tuning range is determined by the angle $\theta_p$, the QPMC and the deflection angle range $\Delta\theta_p$.

Figure 2:
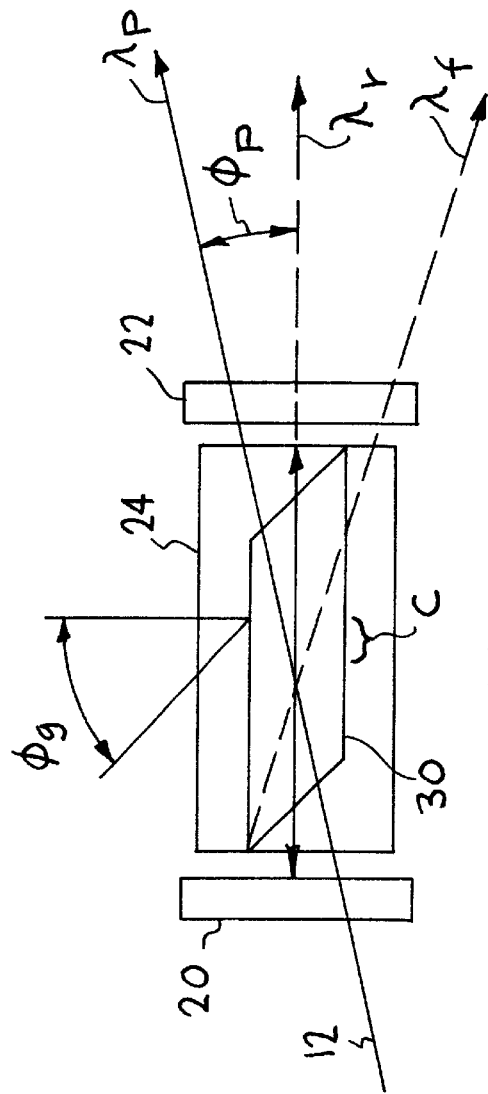
FIG. 2 shows the quasiphasematched crystal with a tiled grating of the present invention.

FIG. 2 shows details of the tilted periodically poled grating 30 inside the OPO cavity, showing the definitions of the pump deflection angle $\phi_p$ and the grating tilt angle $\phi_g$. The optical parametric oscillator is formed by mirrors 20 and 22 and the quasiphasematched crystal QPMC 24. As discussed above, the resonated wavelength $\lambda_r$ and the idler wavelength $\lambda_i$ are generated in the optical parametric oscillator and change as the angle of the pump beam 12 changes. Poled sections of the QPMC 24 are tilted with respect to the resonator axis to vary the required value of the pump-offset angle. The angle of tilt is chosen to maximize beam overlap over the desired tuning range of the device.

Figure 3:
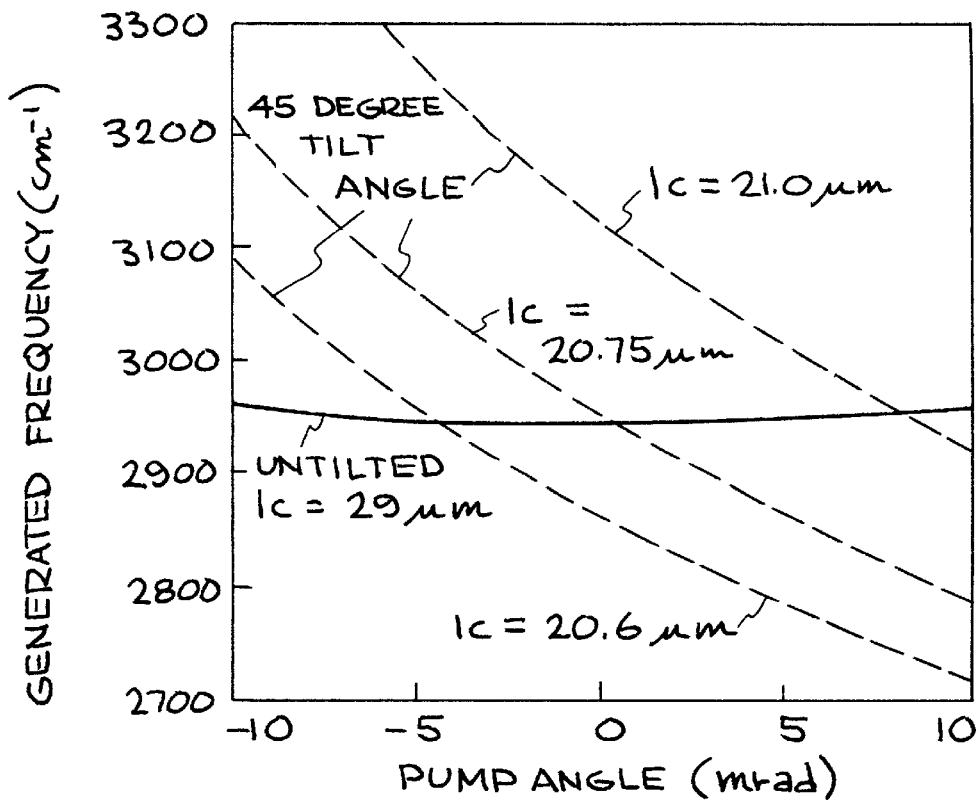
FIG. 3 compares the non-collinear tuning rate for tilted and non-tilted grating.

On embodiment of the invention utilizes periodically poled lithium niobate (PPLN) as the QPMC crystal 24 material, and further includes OPO mirrors 20 and 22 that reflect light in the 2700–3300 $cm^{-1}$ region. This embodiment is pumped by a Nd:YAG laser with a wavelength of 1.06 $\mu$m. FIG. 3 shows tuning curves for tilted and non-tilted grating PPLN OPO's resonating light in the 2700–3300 $cm^{-1}$ region. The figure shows that the tuning range ($cm^{-1}$ per milliradian of pump angle) of the tilted grating device is improved over that of the standard non-tilted grating. This improvement permits substantially larger tuning ranges, thus making it practical to use a QPMC in an FA-OPO device. The performance of the FA-OPO is improved by the large nonlinear coupling coefficient of QPMCs and the flexibility of wavelength tuning range afforded by the variation in poling period.

The second limitation of the previous design is overcome by both the tilted grating design and by the elongation of the transverse profile of the pump beam in the angle-tuning plane of the FA-OPO. This reduces the rate of change of the overlap between the pumped volume in the crystal and the resonated and non-resonated wave mode volumes as the pump beam angle is changed. In the improved FA-OPO device, a beam shaping optic is included to permit the pump beam to be elongated, thus increasing the tuning range over which the FA-OPO can be used without beam shape changes or reduction of conversion efficiency. An embodiment of the beam shaping optic is shown as an anamorphic beam expander comprising a pair of prisms 10 and 11 in FIG. 1.

Figure 4A:
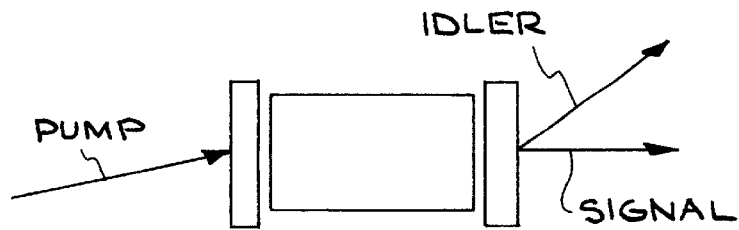
FIG. 4A shows a schematic of an embodiment of the present invention having a tiled domain wall.
Figure 4B:
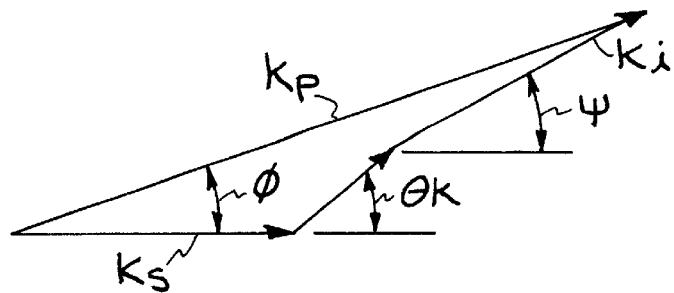
FIG. 4B shows the phase-matching k-vector diagram of the embodiment of FIG. 4A.

A schematic of QPM OPO with a tilted domain wall is shown in FIG. 4A. FIG. 4B shows the phase-matching k-vector diagram of the QPM OPO of FIG. 4A. As shown in FIG. 4B, the tilted domain is represented by an off-axis grating vector K that is at an angle $\theta$ with respect to a resonant 3 $\mu$m signal beam axis. Phase matching in this case is satisfied when the signal, idler and grating k vectors add up vectorially to equal that of the pump. The phase-matching conditions can be expressed as:

$$k_p \cos\phi = k_s + k_i \cos\psi + K \cos\theta$$

$$k_p \sin\phi = k_i \sin\psi + K \sin\theta$$

Figure 5:
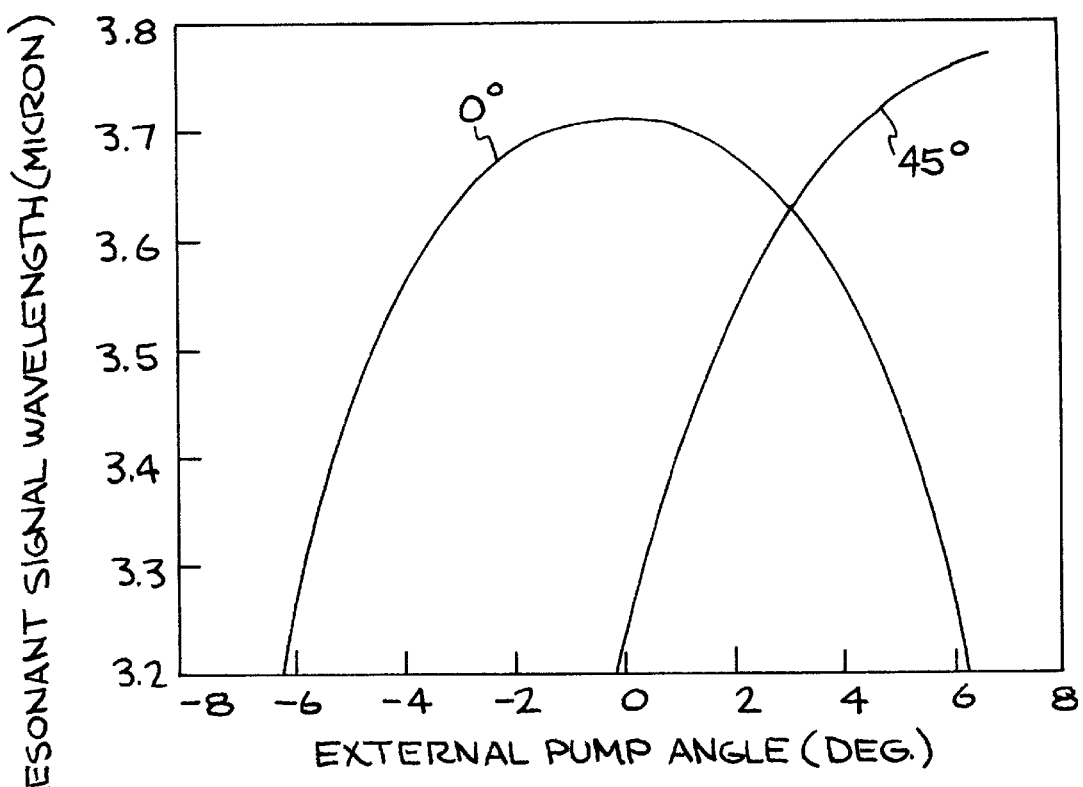
FIG. 5 shows calculated resonant signal tuning curves for the case of no tilt and 45° tilt in the grating vector.

Combining phase matching conditions with energy conservation equations, the wavelength tuning curve for an arbitrary pump angle φ and domain tilt angle θ can be calculated. FIG. 5 shows the calculated wavelength-tuning curve for a 3 µm resonant QPM OPO with domain period of 21 µm and that has the grating vector tilted at 45° with respect to the cavity axis. For comparison, the figure includes the tuning curve for a QPM OPO with θ=0° and grating period of 29 µm.

Comparing the two cases, it can be seen that the symmetry point of the tuning curve is shifted away from the collinear angle when the domain is tilted. Specifically, for the tilted domain case, the resonant signal wavelength can be tuned from 3.2 to 3.7 µm by rotating the pump angle from −0.3° to 4.4°. In contrast, in the zero tilt case, tuning over the same wavelength range would require the pump angle to rotate from 1.4° to 6.3°.

The smaller pump angular range away from collinear required for wavelength tuning in the tilted domain case suggests less spatial walk-off among the interacting beams. To quantify the reduction in spatial beam walk-off in the tilted domain case, effective interaction length, in a noncollinear phase-matching geometry to account for domain tilt, has been derived to be:

$$L_{eff} = 2L_w erf\left(\frac{\sqrt{\pi}}{4} \frac{L}{L_w}\right)$$

where L is the crystal length and the "aperture length" $L_w$ is defined as $$L_w = \frac{\sqrt{\pi}}{2} \frac{W_p}{\beta}$$

$W_p$ is the pump beam $1/e^2$ radius in the equation above. Since the erf function approaches one for large argument, the maximum effective interaction length possible is given by twice the aperture length. In fact, as shown in the effective length equation, it does not pay to have crystal length L much longer than the aperture length.

Given a pump beam radius $W_p$, the aperture length is limited by the effective walk-off parameter β that in this case is defined as (assuming angles φ and θ are small):

$$\beta^2 = \left\{\left[\frac{k_p^2}{2k_i^2}\left(1+\frac{W_p^2}{W_s^2}\right) - \frac{k_p}{k_i} + \frac{\frac{2W_p^2}{W_s^2}+1}{\frac{2W_p^2}{W_s^2}+2}\right]\phi^2 - \frac{K}{k_1}\left[\frac{k_p}{k_i}\left(1+\frac{W_p^2}{W_s^2}\right)-1\right]\theta_\phi + \frac{1}{2}\frac{K^2}{k_i^2}\left(1+\frac{W_p^2}{W_s^2}\right)\theta^2\right\}$$

The first term in the bracket in the expression above accounts for spatial separation between the interaction beams. The second and third terms are reminiscent of terms due to pump beam Poynting vector walk-off in the case of noncollinear phase matching in a birefringently phasematched crystal. Therefore, tilting the domain may be considered to be equivalent to introducing an effective crystal birefringence for the pump beam.

Figure 6:
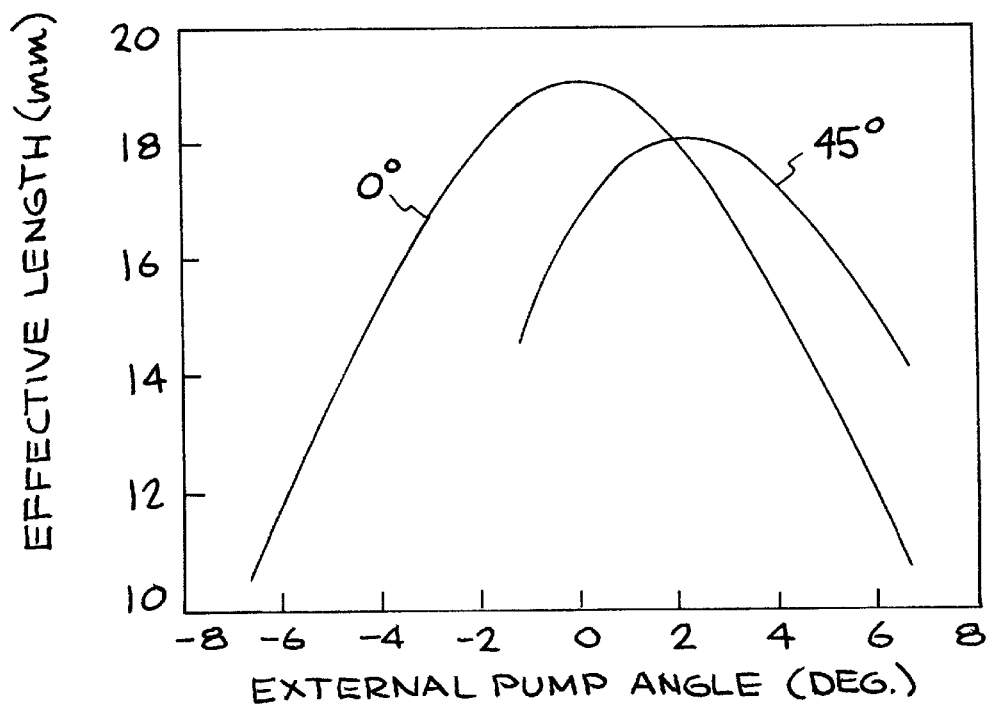
FIG. 6 shows that the effective interaction length peak shifts away from collinear when the domain is tilted.

Using the formula above, the effective interaction length for the two cases considered in FIG. 5 were calculated and the results are shown in FIG. 6. The pump and signal beam waist ($1/e^2$) are assumed to be 320 µm and 500 µm respectively, and the crystal length is assumed to be 19 mm for the calculation.

FIG. 6 shows that, as in the case of the tuning curve, the effective interaction length peak shifts away from collinear when the domain is tilted. For the case where there is no tilt, the effective crystal length changes from 18 mm to 11.5 mm when the wavelength is tuned from 3.2 to 3.7 µm. In contrast, when the domain is tilted at 45°, the effective crystal length varies by less than 1.5 mm over the same tuning range with a maximum effective length of 18 mm.

From FIGS. 5 and 6 above, it can be observed that the dominant effect of tilting the domain is to shift both the symmetry point of the wavelength-tuning curve and the peak of the effective crystal length curve away from collinear. The extent of these shifts as a function of domain tilt angle θ can be determined by examining the two k vector diagrams that correspond to the cases shown in FIGS. 7A and 7B.

Figure 7A:
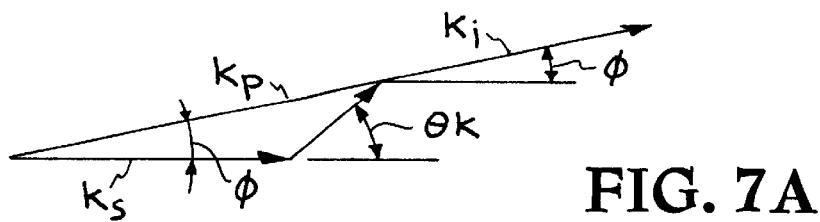
FIG. 7A shows a k vector diagram that correspond to a wavelength tuning symmetry point where $\phi=\psi$.
Figure 7B:
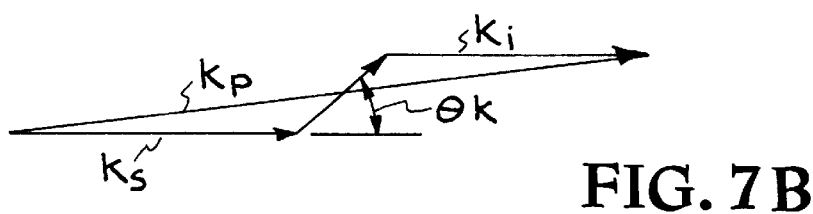
FIG. 7B shows a k vector diagram that correspond to an effective interaction length peak where $\psi=0°$.

Examining FIGS. 7A and 7B, it can be seen that the wavelength tuning symmetry point and the peak $L_{eff}$ location shift in the same direction as the grating vector tilt θ, and the degree of shift is proportional to θ. In particular, the symmetry point location is always shifted more than the location of the peak $L_{eff}$. Therein lies the advantage for tilting the domain. It is desirable to tilt the domain enough such that the peak effective crystal length overlaps with the steeper part of the pump-angle tuning curve (i.e., away from the tuning curve symmetry point). Of course, this is balanced by the need to minimize decrease in peak effective interaction length if the domain tilt is excessive.

Figure 8:
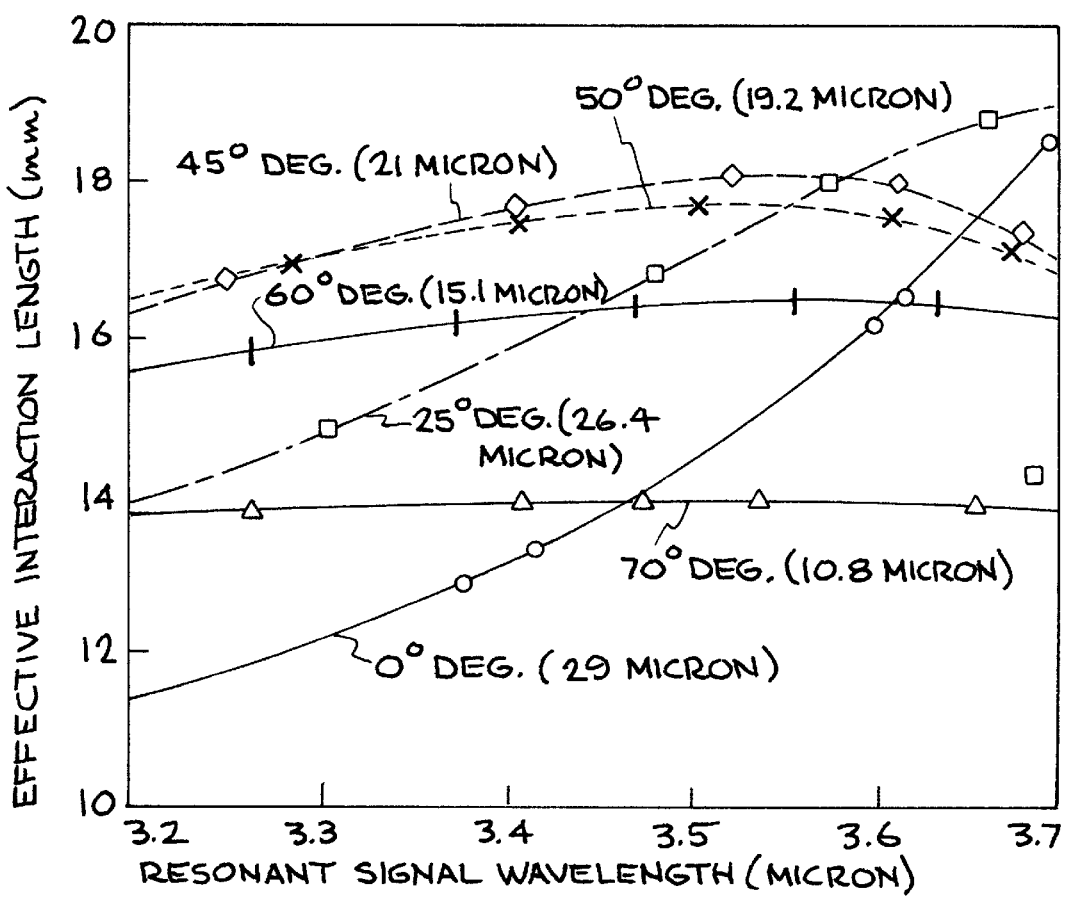
FIG. 8 shows the effective interaction length plotted versus resonant signal wavelength for different domain tilt angles.

Optimizing the domain period at different tilt angle using the two criteria listed above, FIG. 8 is a graph summarizing the optimum effective crystal length versus wavelength for different tilt angles. At each tilt angle, the grating period is optimized to overlap desired tuning range with the peak effective length. FIG. 8 shows that, over the wavelength tuning range from 3.2 to 3.7 µm, the effective crystal length changes by 7 mm for the no tilt case versus 1.5 mm for the 45° tilted case as seen previously from FIG. 6. In fact, the variation in effective length over the tuning range decreases even more as the tilt angle is increased beyond 45°, although the peak interaction length decreases for large tilt angle. Examining FIG. 8, a best-compromised design is reached for a crystal with 45° domain tilt and 21 µm domain period.

To summarize, tilting the domain period has the effect of shifting both the tuning curve symmetry point and the location of the peak effective crystal length. Since these two points shift at different rates, by tilting the grating a sufficient amount, the peak effective crystal length can be positioned to overlap with the desired tuning range. Tilting the domain too far, however, leads to a reduction in peak interaction length. Optimizing the domain tilt angle and domain period for a desired tuning range from 3.2 to 3.7 µm, a compromised design is reached having a crystal with 45° domain tilt and 21 µm domain period.

An embodiment of the present invention, demonstrated in a periodically poled lithium niobate (PPLN) OPO with a tilted grating has produced a tuning range of 2.9 to 3.6 µm, limited by deflector tuning range and mirror coatings. These results have lead to the design of a single device with agility over several atmospheric transmission bands, effectively covering a range of nearly 4000 $cm^{-1}$.

Figure 9:
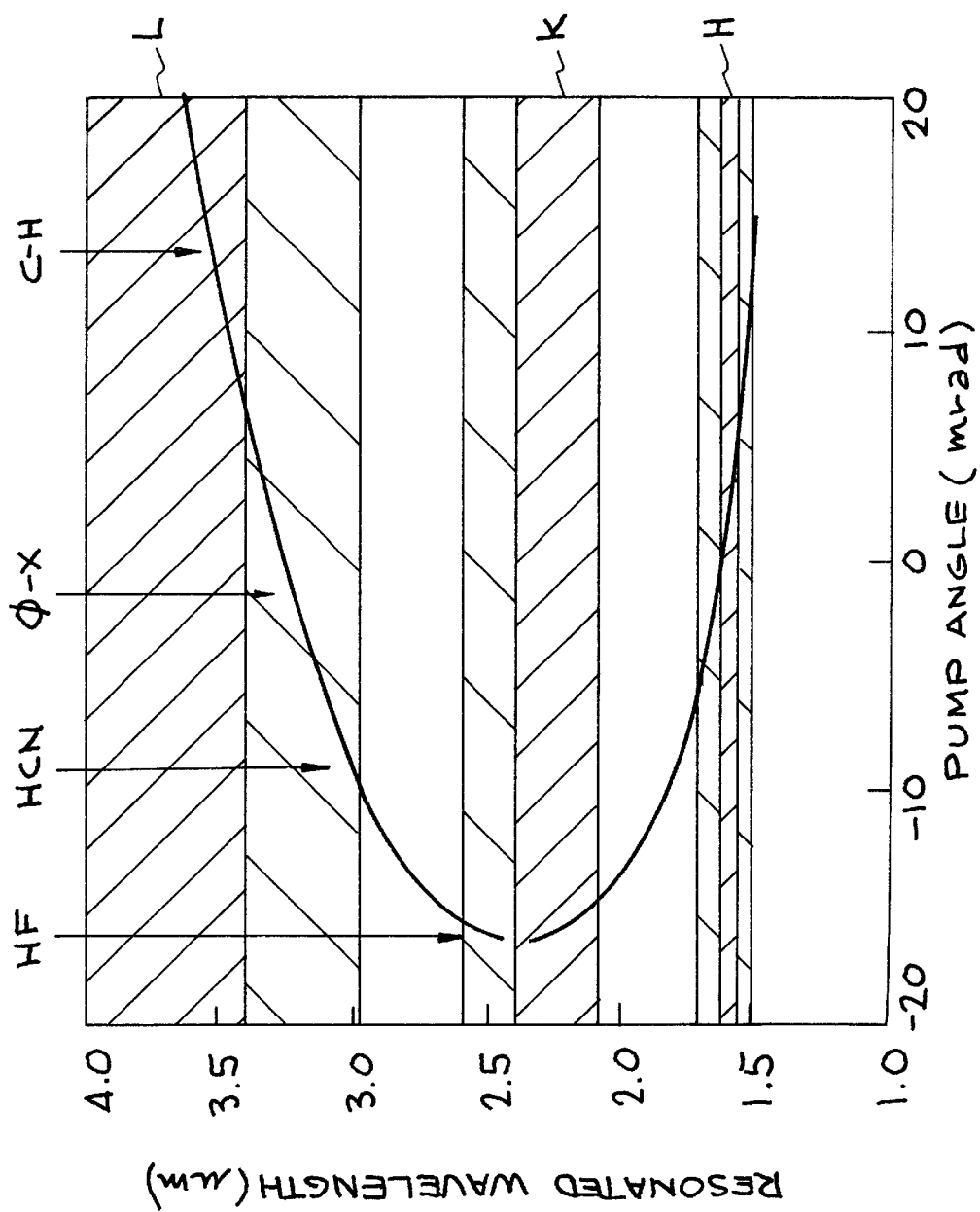
FIG. 9 shows the tuning curve for the resonated waves of a PPLN OPO with 45 degree grating tilt and 20.9 $\mu$m period, where the shaded regions denote the H, K and L atmospheric transmission bands and the positions of several molecular absorption bands are indicated by arrows.

FIG. 9 shows the calculated non-collinear pump tuning curve for PPLN with a 45 degree tilted grating and a poling period of 20.9 µm, pumped by a Nd:YAG laser at 1.064 µm. The "signal" branch tunes from approximately 2.3 µm at a pump angle of −17 milliradians to approximately 1.5 µm at +17 milliradians. The "idler" branch tunes from 2.4 µm to 3.6 µm over the same angular range. At each pump angle, oscillation can occur on either (or both) branch, depending on the mirror coatings. In the case where the mirrors allow both wavelengths to oscillate, it is possible that single wavelength selection can be accomplished by selective seeding. More generally, a tunable intracavity filter could be used to select the desired branch. Note that, unlike the case of a collinear OPO, separation of the "unwanted" free wave from the resonated wave is automatic, since the free wave takes a different angular path.

FIG. 9 also indicates how wavelengths from both branches might be selected to cover three near/mid IR atmospheric transmission bands. The spectral positions of the H, K and L atmospheric transmission bands are denoted in FIG. 9 by the blue, green and red regions. The lighter shaded portions of each band denote the presence of dense fine structure that tails off into strongly absorbing water or carbon dioxide bands. An OPO with mirrors coated to give high reflection in the darker shaded portions of the H, K and L bands would produce light in those bands when the pump angle was tuned to the regions shown at the bottom axis of FIG. 9. Thus moving the pump angle from −15 mrad to ≈5 mrad would cause the output wavelength to change from ≈2.2 $\mu$m to ≈1.6 $\mu$m along the "signal" branch. Moving the pump angle to ≈15 mrad then causes the OPO to jump to the "idler" branch, producing light in the ≈3.5 $\mu$m region.

The availability of such a wide tuning range has implications for several lidar applications, as outlined in the next few paragraphs.

The "idler" tuning branch shown in FIG. 9 represents the tuning range available to a frequency agile MWIR DIAL transmitter. With this device it is possible to directly access wavelengths that are much shorter than the hydrocarbon region (denoted C—H.) Thus, aromatics □-X (≈3.3 $\mu$m), hydrogen cyanide HCN (≈3.0 $\mu$m), and hydrogen fluoride HF (≈2.5 $\mu$m) can also be probed with a DIAL system based on this device. A more aggressive design (shorter period, higher grating tilt) could probably push the tuning range out to 4 microns, which would allow the detection of SO2 as well. Although it would also be desirable to access wavelengths in the ≈5 $\mu$m region for the detection of NO or $N_2O$ for environmental monitoring applications it must be noted that lithium niobate has significant optical absorption at these wavelengths. Therefore, grating periods or grating tilt angles that move the idler branch to longer wavelengths have not been considered.

An aerosol sizing backscatter lidar would emit wavelengths at ≈1.55, ≈2.3 and ≈3.5 $\mu$m (and potentially at the pump wavelength, 1.06 $\mu$m as well) in order to characterize the particle size distribution in some volume of interest. Frequency agility is essential for accurate measurements since the number of particles per unit volume fluctuates in time. Sending out a rapidly cycled wavelength set effectively averages over these fluctuations. For biological cloud identification, the aerosol sizing mode and the DIAL mode would be combined, with the returns from several lines between 3.4 and 3.6 $\mu$m indicating the presence of organic matter. Another reason for combining the DIAL mode with backscatter lidar would be to simultaneously measure the concentration of atmospheric constituents such as water vapor or specific pollutant species such as $SO_2$ or $NO_2$ along with a measurement of the aerosol distribution for environmental monitoring applications.

Frequency agile lidar has been of great interest for target ID, active imaging, and as a means of providing real time calibration data for hyperspectral passive instruments. Although not commonly acknowledged, the retrieval of accurate spectral signatures of hard targets by multispectral lidar instruments on moving surveillance platforms also requires rapid frequency cycling. In non-scanning applications (single spatial pixel) frequency cycling averages over slow changes in atmospheric transmission and target reflectivity as the angle between the target and surveillance platform changes. In active imaging applications, the data rate can be effectively increased by the number of spectral lines, as each single color can only be cycled as fast as the speckle decorrelation rate.

The frequency agile OPO described here represents a comparatively simple approach to a multiband lidar transmitter. It uses a single OPO crystal, rather than the cascaded devices that have been utilized in the past to produce multiband output. Since the wavelengths are produced sequentially (although rapidly,) a singe detector, such as cooled indium antimonide could be used, along with pseudo random code techniques to ensure accurate registration between the detected return pulse and its frequency identity, as implemented in the applicants' current DIAL systems. The tuning characteristics of other QPM materials, such as periodically poled KTA and RTA, and several bulk, birefringence phase-matched crystals are being investigated as well.

In the improved device, the third limitation is overcome by using a folded mirror set to relay the pivot point for beam steering from the beam deflector to the center of the FA-OPO crystal. This reduces the footprint of the device by as much as a factor of two over that obtained when using the refractive telescope design cited in the previous invention.

Particular embodiments of this invention may contain a number of variations or extensions. The QPMC may comprise periodically poled lithium niobate, lithium tantalate, potassium titanyl phosphate (KTP), potassium titanyl arsenate (KTA) or rubidium titanyl arsenate (RTA). Quasiphasematched stacks of GaAs or related semiconductor structures may also be substituted for the QPMC.

Changes and modifications in the specifically described embodiments can be carried out without departing from the scope of the invention, which is intended to be limited by the scope of the appended claims.

What is claimed is:

1. A tunable optical parametric oscillator, comprising:
   means for generating a pump beam;
   a beam deflector for changing the angle of said pump beam about a pivot point;
   a quasi-phasematched nonlinear crystal (QPMC) comprising a grating;
   a resonator cavity formed around said nonlinear crystal, wherein said resonator cavity comprises an optical axis, wherein said grating is tilted with respect to said optical axis; and
   a folded reflective relay telescope to relay the image of said pump beam at said pivot point to an image plane located within said nonlinear crystal.

2. A tunable optical parametric oscillator (OPO), comprising:
   means for generating a pump beam having a transverse profile;
   a beam deflector for changing the angle of said pump beam about a pivot point;
   a quasi-phasematched nonlinear crystal (QPMC comprising a grating,
   a resonator cavity formed around said nonlinear crystal, wherein said resonator cavity comprises an optical axis, wherein said grating comprises a tilt with respect to said optical axis, wherein said grating is periodically poled, wherein said resonator cavity comprises an angle tuning plane;

means for elongating said transverse profile of said pump beam in said angle tuning plane to reduce the rate of change of the overlap between the pumped volume in the crystal and the resonated and non-resonated wave mode volumes as the pump beam angle is changed; and a folded reflective relay telescope to relay the image of said pump beam at said pivot point to an image plane located within said nonlinear crystal, wherein said grating is pumped by said pump beam nearly on-axis with respect to said tilt.

3. The apparatus of claim 2, wherein said means for elongating said transverse profile of said pump beam comprises a prism pair located in said pump beam for anamorphic beam expansion of said pump beam.

4. The apparatus of claim 2, further comprising a beam reducing telescope to demagnify the pump deflection angle.

5. The apparatus of claim 2, further comprising an expanding telescope to magnify the pump deflection angle.

6. The apparatus of claim 2, wherein said resonator cavity comprises a configuration selected from a group consisting of a folded resonator and a ring resonator.

7. The apparatus of claim 2, wherein said resonator cavity comprises a stable resonator.

8. The apparatus of claim 2, wherein said resonator cavity comprises an unstable resonator.

9. The apparatus of claim 2, further comprising an etalon selected from a group consisting of a fixed etalon and a tunable etalon, wherein said etalon is inserted within said resonator cavity to narrow the linewidth of an output bean from said tunable optical parametric oscillator.

10. The apparatus of claim 2, further comprising a seed source for injection seeding said OPO, wherein said seed source is selected from a group consisting of a tunable seed source and a frequency multiplexed seed source.

11. The apparatus of claim 2, wherein said QPMC is selected from a group consisting of lithium niobate, lithium tantalate, potassium titanyl phosphate (KTP), potassium titanyl arsenate (KTA), rubidium titanyl arsenate (RTA), gallium arsenide, and zinc selenide.

12. The apparatus of claim 2, wherein said means for generating a pump beam comprises a laser medium selected from a group consisting of Nd:YAG, Nd:YLF, Tm:YAG, Ho:YAG, Er:YAG and KrF.

13. The apparatus of claim 2, wherein said beam deflector comprises a single transducer $TeO_2$ modulator.

14. The apparatus of claim 2, wherein said beam deflector is selected from a group consisting of a galvanometric moving mirror, an acousto-optic beam deflector and an electro-optic beam deflector.

15. The apparatus of claim 2, wherein said beam deflector comprises a galvanometric mirror combined with an acousto-optic deflector, wherein said galvanometric mirror provides coarse angle changes at a reduced duty factor and said acousto-optic deflector provides fine angle tuning at the full repetition rate of said OPO.

16. A tunable optical parametric oscillator (OPO), comprising:

means for generating a pump beam having a transverse profile;

a beam deflector for changing the angle of said pump beam about a pivot point;

a quasiphasematched stack of semiconductor material comprising a grating;

a resonator cavity formed around said semiconductor material, wherein said resonator cavity comprises an optical axis, wherein said grating comprises a tilt with respect to said optical axis, wherein said grating is periodically poled, wherein said resonator cavity comprises an angle tuning plane;

means for elongating said transverse profile of said pump beam in said angle tuning plane to reduce the rate of change of the overlap between the pumped volume in said quasiphasematched stack of semiconductor material and the resonated and non-resonated wave mode volumes as the pump beam angle is changed; and a folded reflective relay telescope to relay the image of said pump beam at said pivot point to an image plane located within said semiconductor material, wherein said grating is pumped by said pump beam nearly on-axis with respect to said tilt.

17. A method for rapidly tuning an optical parametric oscillator, comprising:

generating a pump beam;

changing, with a beam deflector, the angle of said pump beam about a pivot point; and relaying, with a folded relay telescope, the image of said pump beam at said pivot point to an image plane located within a quasi-phasematched nonlinear crystal (QPMC) comprising a grating, wherein a resonator cavity is formed around said nonlinear crystal and comprises an optical axis and wherein said grating is tilted with respect to said optical axis.

18. A method for rapidly tuning an optical parametric oscillator, comprising:

generating a pump beam having a transverse profile;

changing the angle of said pump beam about a pivot point;

relaying with a folded relay telescope, the image of said pump beam at said pivot point to an image plane located within a quasi-phasematched nonlinear crystal (QPMC) comprising a grating wherein a resonator cavity is formed around said nonlinear crystal and comprises an optical axis and wherein said grating comprises a tilt with respect to said optical axis, wherein said grating is pumped by said pump beam nearly on-axis with respect to said tilt; and elongating said transverse profile of said pump beam in said image plane to reduce the rate of change of the overlap between the pumped volume in the crystal and the resonated and non-resonated wave mode volumes as the pump beam angle is changed.

19. The method of claim 18, wherein said step of elongating said transverse profile of said pump beam comprises locating a prism pair in said pump beam for anamorphic beam expansion of said pump beam.

20. The method of claim 18, wherein said quasi-phasematched nonlinear crystal is selected from a group consisting of lithium niobate, lithium tantalate, potassium titanyl phosphate (KTP), potassium titanyl arsenate (KTA), rubidium titanyl arsenate (RTA), gallium arsenide and zinc selenide.

* * * * *